US011892819B2

(12) United States Patent
Ueyama et al.

(10) Patent No.: US 11,892,819 B2
(45) Date of Patent: Feb. 6, 2024

(54) CONTROL DEVICE, CONTROL SYSTEM, CONTROL METHOD, AND COMPUTER-READABLE STORAGE MEDIUM

(71) Applicant: OMRON Corporation, Kyoto (JP)

(72) Inventors: Yuki Ueyama, Kyoto (JP); Takashi Fujii, Kyoto (JP); Yasuaki Abe, Takatsuki (JP); Kazuhiko Imatake, Osaka (JP); Nobuyuki Sakatani, Otsu (JP)

(73) Assignee: OMRON Corporation, Kyoto (JP)

( * ) Notice: Subject to any disclaimer, the term of this patent is extended or adjusted under 35 U.S.C. 154(b) by 362 days.

(21) Appl. No.: 16/970,620

(22) PCT Filed: Feb. 21, 2019

(86) PCT No.: PCT/JP2019/006595
§ 371 (c)(1),
(2) Date: Aug. 17, 2020

(87) PCT Pub. No.: WO2019/176496
PCT Pub. Date: Sep. 19, 2019

(65) Prior Publication Data
US 2021/0089005 A1    Mar. 25, 2021

(30) Foreign Application Priority Data

Mar. 12, 2018  (JP) ................................ 2018-044282

(51) Int. Cl.
*G05B 19/00*  (2006.01)
*G05B 19/4155*  (2006.01)
(Continued)

(52) U.S. Cl.
CPC ..... *G05B 19/4155* (2013.01); *G05B 13/0265* (2013.01); *G06N 20/00* (2019.01); *G05B 2219/42018* (2013.01)

(58) Field of Classification Search
None
See application file for complete search history.

(56) References Cited

U.S. PATENT DOCUMENTS 4,494,207 A * 1/1985 Chang ...................... G05B 9/03
                                                    700/290
2005/0075993 A1* 4/2005 Jang ..................... G05B 13/027
                                                    706/29
(Continued)

FOREIGN PATENT DOCUMENTS

CN         1851574     10/2006
CN        102418919     4/2012
(Continued)

OTHER PUBLICATIONS

"Office Action of China Counterpart Application" with English translation thereof, dated Jun. 30, 2022, p. 1-p. 16.
(Continued)

*Primary Examiner* — Paul B Yanchus, III
(74) *Attorney, Agent, or Firm* — JCIPRNET

(57) ABSTRACT

An objective of the present invention is to provide a control device, control system, control method, and computer-readable storage medium, for enabling verification of the reliability of operation machine control. Provided is a control device comprising: a control part comprising a controller for outputting output data with regard to input data, said control part serving to control an operation machine using the controller; an acquisition part for acquiring attribute information including statistics of previously obtained input data and output data; and an evaluation part for, on the basis of a comparison of the attribute information with new input
(Continued)

data being newly inputted into the controller and/or new output data being newly outputted from the controller with regard to the new input data, evaluating to what extent the new input data and/or the new output data deviate from the statistics.

14 Claims, 8 Drawing Sheets

(51) Int. Cl.
    *G06N 20/00*     (2019.01)
    *G05B 13/02*     (2006.01)

(56) References Cited

U.S. PATENT DOCUMENTS

2005/0171626 A1* 8/2005 Schwarm ........... G05B 23/0294
                                                                           700/108
2019/0147323 A1* 5/2019 Li ........................ G06N 3/048
                                                                           706/15

FOREIGN PATENT DOCUMENTS

| | | |
|---|---|---|
| CN | 102906771 | 1/2013 |
| CN | 106990760 | 7/2017 |
| CN | 107783423 | 3/2018 |
| EP | 0432267 | 6/1991 |
| JP | H05297904 | 11/1993 |
| JP | H07210209 | 8/1995 |
| JP | H07319508 | 12/1995 |
| JP | H0981203 | 3/1997 |
| JP | 2006343063 | 12/2006 |
| WO | 2019087374 | 5/2019 |

OTHER PUBLICATIONS

"Search Report of Europe Counterpart Application", dated Oct. 18, 2021, p. 1-p. 11.
"International Search Report (Form PCT/ISA/210) of PCT/JP2019/006595", dated May 14, 2019, with English translation thereof, pp. 1-3.
"Written Opinion of the International Searching Authority (Form PCT/ISA/237) of PCT/JP2019/006595", dated May 14, 2019, with English translation thereof, pp. 1-8.

* cited by examiner

CONTROL DEVICE, CONTROL SYSTEM, CONTROL METHOD, AND COMPUTER-READABLE STORAGE MEDIUM

CROSS-REFERENCE TO RELATED APPLICATION

This application is a 371 application of the International PCT application serial no. PCT/JP2019/006595, filed on Feb. 21, 2019, which claims the priority benefits of Japan Patent Application No. 2018-044282, filed on Mar. 12, 2018. The entirety of each of the above-mentioned patent applications is hereby incorporated by reference herein and made a part of this specification.

BACKGROUND

Technical Field

The disclosure relates to a control device, a control system, a control method, and a computer-readable storage medium.

Related Art

Conventionally, a control device is known which controls an operation machine by using a controller for performing classical control such as proportional-integral-differential (PID) control or a controller for performing modern control such as neural network control.

For example, patent literature 1 described below discloses a process driving support method for obtaining a control variable value setting a control object into a target state according to a plurality of input variable values changing with time. In this process driving support method, a neural circuit model is used, the neural circuit model is trained using a pattern of the plurality of input variable values among previous driving history information of the process as an input signal and using a control variable value corresponding to this pattern as a teacher signal, and an arbitrary input variable value pattern is input to the learning-finish neural circuit model, thereby obtaining a control variable value with respect to the pattern.

Patent literature 1: Japanese Patent Laid-Open No. 7-319508

SUMMARY

As in the technique described in patent literature 1, when a controller generated based on previously obtained input data and output data is used to control an operation machine, control of the operation machine is performed with high reliability as long as new input data input to the controller and new output data output from the controller with respect to the new input data are similar to the previously obtained input data and output data.

However, when the new input data and the new output data deviate from the previously obtained input data and output data, because a lack of a track record of using these data to control the operation machine, there is a possibility that the reliability of control is not necessarily high and appropriate control is not performed.

Therefore, the disclosure provides a control device, a control system, a control method, and a computer-readable storage medium capable of confirming the reliability of the control on an operation machine.

A control device according to one aspect of the disclosure includes: a control part that includes a controller for outputting output data with respect to input data and uses the controller to control an operation machine; an acquisition part that acquires attribute information including statistics of the previously obtained input data and output data; and an evaluation part that evaluates, based on comparison of the attribute information with at least one of new input data newly input to the controller and new output data output from the controller with respect to the new input data, to what extent at least one of the new input data and the new output data deviates from the statistics. Here, the attribute information is information representing the characteristics of the input data and the output data and includes the statistics of the input data and the output data. The statistics of the input data and the output data may include the maximum value and the minimum value of the input data and the output data, and may include an average value, a median value, a quartile, a variance, and the like of the input data and the output data.

According to the aspect, by evaluating to what extent at least one of the new input data and the new output data deviates from the statistics, it is possible to confirm whether at least one of the new input data and the new output data is similar to the previously obtained input data and output data, and it is possible to confirm whether the reliability of the control on the operation machine performed by the controller is secured.

In the above aspect, a change part that changes at least one of the new input data and the new output data based on the extent of deviation evaluated by the evaluation part may be further included. For example, the change part may compare the extent of deviation numerically evaluated by the evaluation part with a threshold value, and change at least one of the new input data and the new output data when it is determined that the deviation is larger than the threshold value.

According to the aspect, when it is evaluated that the reliability of the control on the operation machine is not sufficiently high, it is possible to control the operation machine within a range in which the reliability is secured by changing at least one of the new input data and the new output data, and it is possible to prevent failure and malfunction of the operation machine.

In the above aspect, the change part may not use at least one of the new input data and the new output data based on the extent of deviation evaluated by the evaluation part, and the control part may use another controller different from the above controller to control the operation machine.

According to the aspect, when it is evaluated that the reliability of the control on the operation machine is not sufficiently high, it is possible to control the operation machine using another controller in which the reliability is secured without using at least one of the new input data and the new output data, and it is possible to prevent failure and malfunction of the operation machine.

In the above aspect, the attribute information may further include a measurement amount including at least one of information regarding an environment in which the operation machine operates and information regarding a state of the operation machine that are measured previously by a measurement device, and the evaluation part may evaluate, based on comparison of the attribute information with a new measurement amount measured by the measurement device when at least one of the new input data and the new output data is generated, to what extent the new measurement amount deviates from the measurement amount.

According to the aspect, by evaluating to what extent the new measurement amount deviates from the previously measured measurement amount, it is possible to confirm whether at least one of the current environment in which the operation machine operates and the current state of the operation machine deviates from at least one of the past environment in which the operation machine operates and the past state of the operation machine, and it is possible to confirm whether the reliability of the control on the operation machine performed by the controller is secured.

In the above aspect, the information regarding the environment may include information regarding a time at which the operation machine is controlled by the control part, and the information regarding the state may include information for distinguishing whether the operation machine is in operation or stopped. Here, the information regarding the environment may include information regarding climate such as the temperature and the humidity of a room in which the operation machine operates. In addition, the information for distinguishing whether the operation machine is in operation or stopped may be at least binary information and may not be character information.

According to the aspect, it is possible to confirm whether the current time at which the operation machine operates deviates from the past time at which the operation machine operated, and it is possible to confirm whether the environment in which the operation machine is controlled is different from before. In addition, it is possible to prevent the evaluation part from evaluating the deviation between the statistics of the input data and the output data obtained when the operation machine is stopped and the new input data and the new output data, and it is possible to more accurately confirm the reliability of the control on the operation machine performed by the controller.

In the above aspect, a setting part that sets a reference for performing comparison between the new measurement amount and the measurement amount by the evaluation part may be further included.

According to the aspect, by setting a reference for evaluating to what extent the new measurement amount deviates from the previously measured measurement amount, it is possible to confirm the extent of deviation by comparison with the reference, and it is possible to more easily confirm whether the reliability of the control on the operation machine performed by the controller is secured.

In the above aspect, the input data and the output data may include numerical data, the attribute information may include the maximum value and the minimum value of the input data and the output data, and the evaluation part may evaluate to what extent at least one of the new input data and the new output data deviates from the maximum value and the minimum value. Here, the evaluation part may evaluate the deviation between the new input data and the statistics according to whether the new input data newly input to the controller is greater than or equal to the minimum value and less than or equal to the maximum value of the previously obtained input data. In addition, the evaluation part may evaluate the deviation between the new output data and the statistics according to whether the new output data output from the controller is greater than or equal to the minimum value and less than or equal to the maximum value of the previously obtained output data.

According to the aspect, by evaluating to what extent at least one of the new input data and the new output data deviates from the maximum value and the minimum value of the previously obtained input data and output data, it is possible to confirm whether at least one of the new input data and the new output data is similar to the previously obtained input data and output data, and it is possible to confirm whether the reliability of the control on the operation machine performed by the controller is secured.

In the above aspect, the input data and the output data may include numerical data, the attribute information may include probability distributions of the input data and the output data, and the evaluation part may evaluate, based on values of the probability distributions, to what extent at least one of the new input data and the new output data deviates from the input data and the output data. Here, the evaluation part may calculate a probability at which the new input data is obtained based on the probability distribution obtained from the previously obtained input data, and evaluate the extent of deviation between the previously obtained input data and the new input data based on this probability. In addition, the evaluation part may calculate a probability at which that the new output data is obtained based on the probability distribution obtained from the previously obtained output data, and evaluate the extent of deviation between the previously obtained output data and the new output data based on this probability.

According to the aspect, it is possible to confirm whether at least one of the new input data and the new output data is similar to the previously obtained input data and output data based on the values of the probability distributions of the previously obtained input data and output data, and it is possible to confirm whether the reliability of the control on the operation machine performed by the controller is secured.

In the above aspect, the controller may include a learning-finish model generated by machine learning in which learning data defining a relationship between the input data and the output data is used.

According to the aspect, it is possible to confirm whether at least one of the new input data and the new output data is similar to the input data and the output data used for generating the learning-finish model, and it is possible to confirm whether the reliability of the control on the operation machine performed by the controller is secured.

A control system according to another aspect of the disclosure includes: a learning device that executes learning processing of a controller by machine learning in which learning data defining a relationship between input data and output data is used, and a control device having a control part that uses the controller to control an operation machine. The learning device further includes a generation part that generates attribute information including statistics of the previously obtained input data and output data. The control device further includes: an acquisition part that acquires the attribute information, and an evaluation part that evaluates, based on comparison of the attribute information with at least one of new input data newly input to the controller and new output data output from the controller with respect to the new input data, to what extent at least one of the new input data and the new output data deviates from the statistics.

According to the aspect, by evaluating to what extent at least one of the new input data and the new output data deviates from the statistics, it is possible to confirm whether at least one of the new input data and the new output data is similar to the input data and output data used for generating the learning-finish model, and it is possible to confirm whether the reliability of the control on the operation machine performed by the controller is secured.

In the above aspect, a measurement device that measures information regarding an environment in which the operation machine operates may be further included, and the generation part may generate the attribute information based on the information regarding the environment.

According to the aspect, by measuring the information regarding the environment in which the operation machine operates, it is possible to confirm whether the current environment in which the operation machine operates deviates from the past environment, and it is possible to confirm whether the reliability of the control on the operation machine performed by the controller is secured.

In the above aspect, a measurement device that measures information regarding a state of the operation machine may be included, and the generation part may generate the attribute information based on the information regarding the state.

According to the aspect, by measuring the information regarding the state of the operation machine, it is possible to confirm whether the current state of the operation machine deviates from the past state of the operation machine, and it is possible to confirm whether the reliability of the control on the operation machine performed by the controller is secured.

A control method according to another aspect of the disclosure includes: using a controller for outputting output data with respect to input data to control an operation machine; acquiring attribute information including statistics of the input data and the output data; and evaluating, based on comparison of the attribute information with at least one of new input data newly input to the controller and new output data output from the controller with respect to the new input data, to what extent at least one of the new input data and the new output data deviates from the statistics.

According to the aspect, by evaluating to what extent at least one of the new input data and the new output data deviates from the statistics, it is possible to confirm whether at least one of the new input data and the new output data is similar to the previously obtained input data and output data, and it is possible to confirm whether the reliability of the control on the operation machine performed by the controller is secured.

A computer-readable storage medium according to another aspect of the disclosure causes a calculation part equipped in a control device to operate as: a control part that includes a controller for outputting output data with respect to input data and uses the controller to control an operation machine; an acquisition part that acquires attribute information including statistics of the input data and the output data; and an evaluation part that evaluates, based on comparison of the attribute information with at least one of new input data newly input to the controller and new output data output from the controller with respect to the new input data, to what extent at least one of the new input data and the new output data deviates from the statistics.

According to the aspect, by evaluating to what extent at least one of the new input data and the new output data deviates from the statistics, it is possible to confirm whether at least one of the new input data and the new output data is similar to the previously obtained input data and output data, and it is possible to confirm whether the reliability of the control on the operation machine performed by the controller is secured.

According to the disclosure, a control device, a control system, a control method, and a computer-readable storage medium capable of confirming the reliability of the control on an operation machine are provided.

DESCRIPTION OF THE EMBODIMENTS

Hereinafter, an embodiment according to one aspect of the disclosure (hereinafter referred to as "the embodiment") is described with reference to the drawings. Besides, in each of the drawings, those denoted by the same reference signs have the same or similar configurations.

§ 1 Application Example

Figure 1:
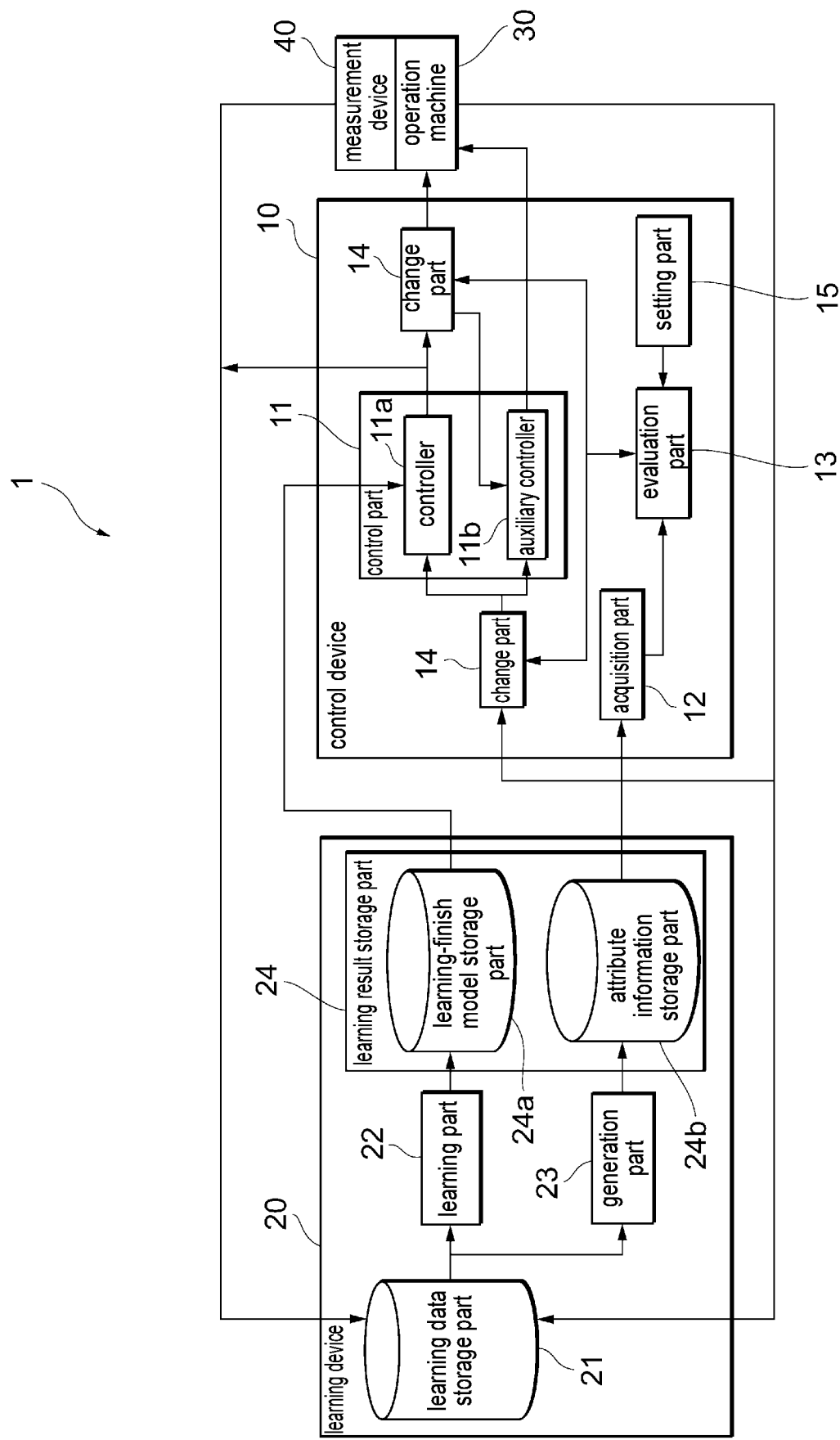
FIG. 1 is a diagram showing functional blocks of a control system according to an embodiment of the disclosure.

First, an example of a scene in which the disclosure is applied is described with reference to FIG. 1. FIG. 1 is a diagram showing functional blocks of a control system 1 according to the embodiment of the disclosure. The control system 1 according to the embodiment includes a learning device 20 that executes learning processing of a controller 11a by machine learning in which learning data defining a relationship between input data and output data is used, and a control device 10 having a control part 11 that uses the controller 11a to control an operation machine 30. Besides, in this example, the control device 10 that controls the operation machine 30 using the controller 11a generated by the machine learning of the learning device 20 is described, but the controller 11a is not necessarily generated by the machine learning, and may control the operation machine 30 based on a theoretically derived relational expression or an empirically derived relational expression regarding the relationship between the input data and the output data. In addition, in the example, a case in which the control device 10 and the learning device 20 are separated is shown, but the control device 10 and the learning device 20 may be configured as an integrated device. For example, the control device 10 and the learning device 20 may be realized as different operations of a programmable logic controller (PLC).

The learning device 20 includes a learning data storage part 21, a learning part 22, a generation part 23, and a learning result storage part 24. The learning data storage part 21 may store, as learning data, input data input to the control device 10 for controlling the operation machine 30 and output data output from the control part 11. The input data and the output data may be sequentially stored and accumulated in the learning data storage part 21. The learning part 22 executes the learning processing of the controller 11a by machine learning in which the learning data stored in the learning data storage part 21 is used. For example, the learning part 22 may perform the learning processing of the controller 11a based on previously obtained input data so that output data corresponding to the input data is output. The controller 11a may be configured by an arbitrary learning model, for example, a neural network.

The generation part 23 generates attribute information including statistics of the previously obtained input data and output data. Here, the input data and the output data may include numerical data, and the attribute information may include at least the maximum value and the minimum value of the input data and the output data. The statistics of the input data and the output data included in the attribute information may be an amount other than the maximum value and the minimum value of the input data and the output data, and may include, for example, an average value, a median value, a quartile, a variance, and the like of the input data and the output data.

The learning result storage part 24 may include a learning-finish model storage part 24a that stores a learning-finish model generated by the learning processing executed by the learning part 22, and an attribute information storage part 24b that stores the attribute information generated by the generation part 23. Here, the learning-finish model and the attribute information including the statistics of the input data and the output data used for the learning processing of the learning-finish model may be stored in association with each other.

The control device 10 includes: the control part 11 that includes the controller 11a for outputting output data with respect to input data and uses the controller 11a to control the operation machine 30, an acquisition part 12 that acquires attribute information, an evaluation part 13, a change part 14, and a setting part 15. A learning-finish model generated by the learning part 22 performing machine learning using learning data and stored in the learning-finish model storage part 24a may be implemented in the controller 11a. In addition, the acquisition part 12 may acquire attribute information associated with the learning-finish model implemented in the controller 11a from the attribute information storage part 24b.

The evaluation part 13 evaluates, based on comparison of the attribute information with at least one of new input data newly input to the controller 11a and new output data output from the controller 11a with respect to the new input data, to what extent at least one of the new input data and the new output data deviates from the statistics included in the attribute information. For example, the evaluation part 13 may compare the new input data newly input to the controller 11a with the minimum value and the maximum value of the previously obtained input data, and evaluate the deviation between the new input data and the statistics according to whether the new input data is greater than or equal to the minimum value and less than or equal to the maximum value of the previously obtained input data. More specifically, when the new input data is greater than or equal to the minimum value and less than or equal to the maximum value of the previously obtained input data, it may be evaluated that there is no deviation, and when the new input data is smaller than the minimum value or larger than the maximum value of the previously obtained input data, the difference between the new input data and the minimum value or maximum value may be evaluated as the deviation. In addition, for example, the evaluation part 13 may compare the new output data output from the controller 11a with the minimum value and the maximum value of the previously obtained output data, and evaluate the deviation between the new output data and the statistics according to whether the new output data is greater than or equal to the minimum value and less than or equal to the maximum value of the previously obtained output data. More specifically, when the new output data is greater than or equal to the minimum value and less than or equal to the maximum value of the previously obtained output data, it may be evaluated that there is no deviation, and when the new output data is smaller than the minimum value or larger than the maximum value of the previously obtained output data, the difference between the new output data and the minimum value or maximum value may be evaluated as the deviation.

In this manner, it is possible to confirm whether at least one of the new input data and the new output data is similar to the previously obtained input data and output data by evaluating to what extent at least one of the new input data and the new output data deviates from the statistics, and it is possible to confirm whether the reliability of the control on the operation machine 30 performed by the controller 11a is secured. Thereby, it is possible to easily confirm whether the operation machine 30 is appropriately controlled, and to prevent malfunction or failure of the operation machine 30.

§ 2 Configuration Example

[Functional Configuration]
<Learning Device>

The learning device 20 includes the learning data storage part 21, the learning part 22, the generation part 23, and the learning result storage part 24. The learning data storage part 21 may store, in association, the input data input to the control device 10 in order to control the operation machine 30, the output data output from the control part 11, and the information regarding the environment in which the operation machine 30 operates and the information regarding the state of the operation machine 30 that are measured by a measurement device 40. These pieces of information may be sequentially stored and accumulated in the learning data storage part 21.

The learning part 22 executes the learning processing of the controller 11a by machine learning in which the learning data stored in the learning data storage part 21 is used. For example, the learning part 22 may perform the learning processing of the controller 11a based on the previously obtained input data so that the output data corresponding to the input data is output. The controller 11a may be configured by an arbitrary learning model, for example, a neural network for example. When the controller 11a is configured by a neural network, the learning part 22 may perform learning processing of the neural network by an error back propagation method. In addition, the learning part 22 may perform the learning processing of the controller 11a based on the previously obtained input data, the information regarding the environment in which the operation machine 30 operates, and the information regarding the state of the operation machine 30 so that the output data corresponding to the input data is output.

The generation part 23 generates attribute information including the statistics of the previously input data and output data. Here, the input data and the output data may include numerical data, and the attribute information may include the maximum value and the minimum value of the input data and the output data. In addition, the attribute information may include probability distributions of the input data and the output data. The probability distribution of the input data may be, for example, a distribution in which the average and the variance of a normal distribution are set as the sample average and the sample variance of the input data, and the probability distribution of the output data may be, for example, a distribution in which the average and the variance of a normal distribution are set as the sample average and the sample variance of the output data. Besides, when the input data or the output data includes a plurality of clusters, the probability distribution may be, for example, a distribution in which a plurality of averages and a plurality of variances of a mixture normal distribution are set as the average and the variance for each cluster of the input data or the output data.

The attribute information may further include a measurement amount including at least one of the information regarding the environment in which the operation machine 30 operates and the information regarding the state of the operation machine 30 that are measured previously by the measurement device 40. Then, the information regarding the environment may include information regarding a time at which the operation machine 30 is controlled by the control part 11. The information regarding the environment may include information regarding climate such as the temperature and the humidity of a room in which the operation machine 30 operates. In addition, the information regarding the state may include information for distinguishing whether the operation machine 30 is in operation or stopped. Here, the information for distinguishing between the operation and the stop may be at least binary information, and may not be character information. In addition, the information regarding the state may include information regarding power consumption when the operation machine 30 is in operation, or may include information regarding a reason for stopping when the operation machine 30 is stopped. Here, the reason for stopping may be that the operation is temporarily stopped due to the setting operation of the operation machine 30, or that the operation machine 30 is urgently stopped.

By including the information regarding the time at which the operation machine 30 is controlled by the control part 11 as the information regarding the environment, it is possible to confirm whether the current time at which the operation machine 30 operates deviates from the past time at which the operation machine 30 operated, and it is possible to confirm whether the environment in which the operation machine 30 is controlled is different from before. In addition, by including the information for distinguishing whether the operation machine 30 is in operation or stopped as the information regarding the state, it is possible to prevent the evaluation part 13 from evaluating the deviation between the statistics of the input data and the output data obtained when the operation machine 30 is stopped and the new input data and the new output data, and it is possible to more accurately confirm the reliability of the control on the operation machine 30 performed by the controller 11a. Furthermore, the input data and the output data obtained when the operation machine 30 is stopped can be excluded from the learning data so as to accumulate the input data and the output data obtained when the operation machine 30 is in operation in the learning data storage part 21 as the learning data, and the learning processing of the controller 11a can be performed so that the relationship between the input data and the output data used for controlling the operation machine 30 in operation can be reproduced with high precision.

The learning result storage part 24 may include the learning-finish model storage part 24a that stores the learning-finish model generated by the learning processing executed by the learning part 22, and the attribute information storage part 24b that stores the attribute information generated by the generation part 23. Here, the learning-finish model and the attribute information including the statistics of the input data and the output data used for the learning processing of the learning-finish model may be stored in association with each other.

<Control Device>

The control device 10 includes the control part 11, the acquisition part 12, the evaluation part 13, the change part 14, and the setting part 15. The control part 11 includes the controller 11a for outputting output data with respect to input data and uses the controller 11a to control the operation machine 30. The controller 11a may include a learning-finish model generated by machine learning in which learning data defining a relationship between the input data and the output data is used, and a learning-finish model generated by the learning part 22 and stored in the learning-finish model storage part 24a may be implemented in the controller 11a. Thereby, it is possible to confirm whether at least one of the new input data and the new output data is similar to the input data and the output data used for generating the learning-finish model, and it is possible to confirm whether the reliability of the control on the operation machine 30 performed by the controller 11a is secured.

The acquisition part 12 acquires the attribute information including the statistics of the previously obtained input data and output data. The acquisition part 12 may acquire the attribute information associated with the learning-finish model implemented in the controller 11a from the attribute information storage part 24b.

The evaluation part 13 evaluates, based on comparison of the attribute information with at least one of new input data newly input to the controller 11a and new output data output from the controller 11a with respect to the new input data, to what extent at least one of the new input data and the new output data deviates from the statistics.

When the maximum value and the minimum value of the previously obtained input data and output data are included in the attribute information, the evaluation part 13 may evaluate to what extent at least one of the new input data and the new output data deviates from the maximum value and the minimum value of the previously obtained input data and output data. By evaluating to what extent at least one of the new input data and the new output data deviates from the maximum value and the minimum value of the previously obtained input data and output data, it is possible to confirm whether at least one of the new input data and the new output data is similar to the previously obtained input data and output data, and it is possible to confirm whether the reliability of the control on the operation machine 30 performed by the controller 11a is secured.

When the probability distributions of the previously obtained input data and output data are included in the attribute information, the evaluation part 13 may evaluate, based on the values of the probability distributions, to what extent at least one of the new input data and the new output data deviates from the previously obtained input data and output data. Specifically, a probability at which the new input data is obtained may be calculated based on the probability distribution obtained from the previously obtained input data, and the extent of deviation between the previously obtained input data and the new input data may be evaluated based on this probability. In addition, a probability at which the new output data is obtained may be calculated based on the probability distribution obtained from the previously obtained output data, and the extent of deviation between the previously obtained output data and the new output data may be evaluated based on this probability. It is possible to confirm whether at least one of the new input data and the new output data is similar to the previously obtained input data and output data based on the values of the probability distributions of the previously obtained input data and output data, and it is possible to confirm whether the reliability of the control on the operation machine 30 performed by the controller 11a is secured.

When the measurement amount including at least one of the information regarding the environment in which the operation machine 30 operates and the information regarding the state of the operation machine 30 that are measured previously by the measurement device 40 is included in the attribute information, the evaluation part 13 may evaluate, based on comparison of the attribute information with a new measurement amount measured by the measurement device 40 when at least one of the new input data and the new output data is generated, to what extent the new measurement amount deviates from the previously measured measurement amount. By evaluating to what extent the new measurement amount deviates from the previously measured measurement amount, it is possible to confirm whether at least one of the current environment in which the operation machine 30 operates and the current state of the operation machine 30 deviates from at least one of the past environment in which the operation machine 30 operates and the past state of the operation machine 30, and it is possible to confirm whether the reliability of the control on the operation machine 30 performed by the controller 11a is secured.

The change part 14 changes at least one of the new input data and the new output data based on the extent of deviation evaluated by the evaluation part 13. For example, the change part 14 may compare the extent of deviation numerically evaluated by the evaluation part 13 with a threshold value, and change at least one of the new input data and the new output data when it is determined that the deviation is larger than the threshold value. In this manner, when it is evaluated that the extent of deviation evaluated by the evaluation part 13 is large and the reliability of the control on the operation machine 30 is not sufficiently high, it is possible to control the operation machine 30 within a range in which the reliability is secured by changing at least one of the new input data and the new output data, and it is possible to prevent failure and malfunction of the operation machine 30.

More specifically, the change part 14 may not use at least one of the new input data and the new output data based on the extent of deviation evaluated by the evaluation part 13. In this case, the control part 11 may use an auxiliary controller 11b different from the controller 11a to control the operation machine 30. Here, the auxiliary controller 11b corresponds to "another controller" of the disclosure. The auxiliary controller 11b may be a controller that performs classical control such as PID control or a controller that performs modern control. In this manner, when it is evaluated that the extent of deviation evaluated by the evaluation part 13 is large and the reliability of the control on the operation machine 30 is not sufficiently high, it is possible to control the operation machine 30 by using another controller in which the reliability is secured without using at least one of the new input data and the new output data, and it is possible to prevent failure and malfunction of the operation machine 30.

When the measurement amount including at least one of the information regarding the environment in which the operation machine 30 operates and the information regarding the state of the operation machine 30 is measured by the measurement device 40, the setting part 15 sets a reference for the comparison performed by the evaluation part 13 between the new measurement amount and the previously measured measurement amount. For example, the setting part 15 may set a threshold value used in the comparison between the new measurement amount and the previously measured measurement amount. Here, a plurality of threshold values may be set according to the extent of deviation. For example, when the information regarding the environment in which the operation machine 30 operates includes the information regarding the time at which the operation machine 30 is controlled by the control part 11, the setting part 15 may set a threshold value for determining whether the current time at which the operation machine 30 operates deviates from the past time at which the operation machine 30 operated. For example, the setting part 15 may set a threshold value defining a plurality of time zones in which the operation machine 30 operates. More specifically, when the plurality of time zones in which the operation machine 30 operates is divided into four such as morning, afternoon, evening, and night, six times defining the four time zones may be set as the threshold values. In addition, for example, the setting part 15 may set a threshold value defining a season in which the operation machine 30 operates. More specifically, when the season in which the operation machine 30 operates is divided into four such as spring, summer, autumn, and winter, four dates defining the four seasons may be set as the threshold values. In addition, for example, when the information regarding the environment in which the operation machine 30 operates includes the information regarding the temperature and the humidity of the room in which the operation machine 30 operates, the setting part 15 may set a threshold value for determining whether the current temperature and humidity of the room in which the operation machine 30 operates deviate from the past temperature and humidity. In this manner, by setting a reference when it is evaluated to what extent the new measurement amount deviates from the previously measured measurement amount, it is possible to confirm the extent of deviation by comparison with the reference, and to more easily confirm whether the reliability of the control on the operation machine 30 performed by the controller 11a is secured.

<Operation Machine>

The operation machine 30 may be a machine that performs an arbitrary operation, for example, a robot or an actuator arranged in a production line. The operation machine 30 may be feedback-controlled by the control device 10, and the current control amount of the operation machine 30 may be acquired by the control device 10 and used as the input data of the controller 11a. In addition, the input data and the output data of the control device 10 may be sequentially stored in the learning data storage part 21.

<Measurement Device>

The measurement device 40 measures the information regarding the environment in which the operation machine 30 operates or measures the information regarding the state of the operation machine 30. The measurement amount measured by the measurement device 40 may be sequentially stored in the learning data storage part 21.

According to the control system 1 of the embodiment, by evaluating to what extent at least one of the new input data and the new output data deviates from the statistics of the previously obtained input data and output data, it is possible to confirm whether at least one of the new input data and the new output data is similar to the input data and the output data used for generating the learning-finish model, and it is possible to confirm whether the reliability of the control on the operation machine 30 performed by the controller 11a is secured.

In addition, by measuring the information regarding the environment in which the operation machine 30 operates by the measurement device 40 and generating the attribute information by the generation part 23 based on the information regarding the environment, it is possible to confirm whether the current environment in which the operation machine 30 operates deviates from the past environment, and it is possible to confirm whether the reliability of the control on the operation machine 30 performed by the controller 11a is secured.

In addition, by measuring the information regarding the state of the operation machine 30 by the measurement device 40 and generating the attribute information by the generation part 23 based on the information regarding the state, it is possible to confirm whether the current state of the operation machine 30 deviates from the past state of the operation machine 30, and it is possible to confirm whether the reliability of the control on the operation machine 30 performed by the controller 11a is secured.

[Hardware Configuration]

Figure 2:
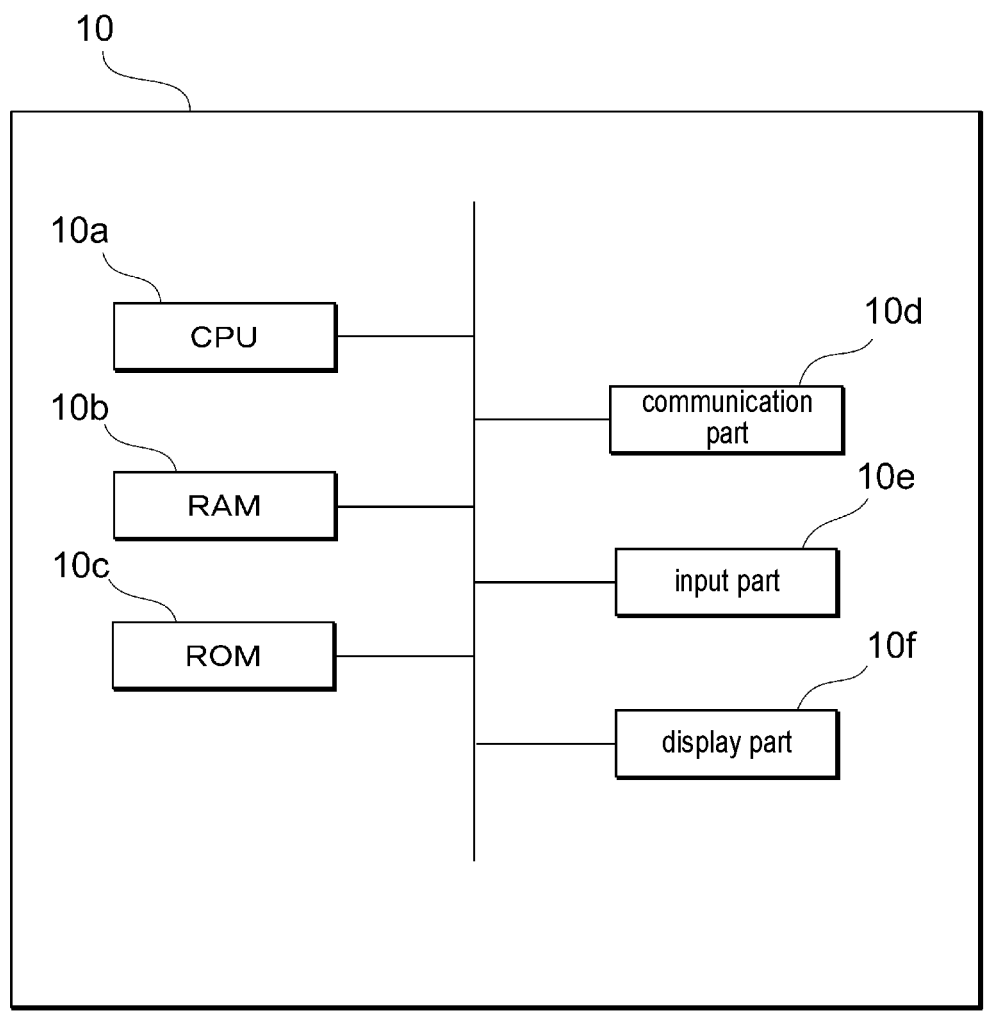
FIG. 2 is a diagram showing physical configurations of a control device according to the embodiment.

FIG. 2 is a diagram showing physical configurations of the control device 10 according to the embodiment. The control device 10 includes a central processing unit (CPU) 10a corresponding to a calculation part, a random access memory (RAM) 10b corresponding to a storage part, a read only memory (ROM) 10c corresponding to a storage part, a communication part 10d, an input part 10e, and a display part 10f. These respective configurations are connected to each other via a bus so that data can be transmitted and received therebetween. Besides, in this example, a case in which the control device 10 is configured by one computer is described, but the control device 10 may be realized using a plurality of computers. In addition, the configuration shown in FIG. 2 is an example, and the control device 10 may have a configuration other than these configurations, or may not have some of these configurations.

The CPU 10a is a control part that performs control or data calculation and processing regarding the execution of programs stored in the RAM 10b or the ROM 10c. The CPU 10a is a calculation part that evaluates to what extent at least one of the new input data and the new output data deviates from the statistics of the previously obtained input data and output data, and executes a program (control program) for controlling the operation machine 30. The CPU 10a receives various input data from the input part 10e or the communication part 10d and displays a calculation result of the input data on the display part 10f or stores the calculation result in the RAM 10b or the ROM 10c.

The RAM 10b is a data-rewritable unit of the storage part and may be configured by, for example, a semiconductor storage element. The RAM 10b may store the control program executed by the CPU 10a, and data such as the input data input to the controller 11a and the output data output from the controller 11a. Besides, these are illustrative, and the RAM 10b may store data other than the control program and data or may not store a part of the control program and data.

The ROM 10c is a data-readable unit of the storage part and may be configured by, for example, a semiconductor storage element. The ROM 10c may store, for example, a control program or data that is not rewritable.

The communication part 10d is an interface that connects the control device 10 to other equipment. The communication part 10d may be connected to the learning device 20, the operation machine 30, and the measurement device 40 by a local area network (LAN) for example, and may receive information for constituting the learning-finish model from the learning device 20, or transmit output data of the controller 11a to the operation machine 30, or receive a measurement amount from the measurement device 40. The communication part 10d may be connected to a communication network such as the Internet. Besides, when the control device 10 and the learning device 20 are configured as an integrated device, the communication part 10d may include inter-process communication between a process operating as the control device 10 and a process operating as the learning device 20.

The input part 10e receives data input from a user and may include, for example, a keyboard, a mouse, and a touch panel. The input part 10e may receive, for example, input of the threshold value set by the setting part 15.

The display part 10f visually displays the calculation result obtained by the CPU 10a and may be configured by, for example, a liquid crystal display (LCD). The display part 10f may display, for example, a measurement amount measured by the measurement device 40 or an operation history of the operation machine 30.

The control program may be stored and provided in a computer-readable storage medium such as the RAM 10b or the ROM 10c, or may be provided via the communication network connected by the communication part 10d. In the control device 10, the CPU 10a executes the control program, and thereby the operations of the control part 11, the acquisition part 12, the evaluation part 13, the change part 14, and the setting part 15 described with reference to FIG. 1 are realized by the CPU 10a. When the control program is executed by the CPU 10a, the control program may be expanded in the RAM 10b, and the control program expanded in the RAM 10b may be interpreted and executed by the CPU 10a. Besides, these physical configurations are illustrative and may not be independent configurations. For example, the control device 10 may include a large-scale integration (LSI) in which the CPU 10a and the RAM10b or ROM10c are integrated.

§ 3 Operation Example

Figure 3:
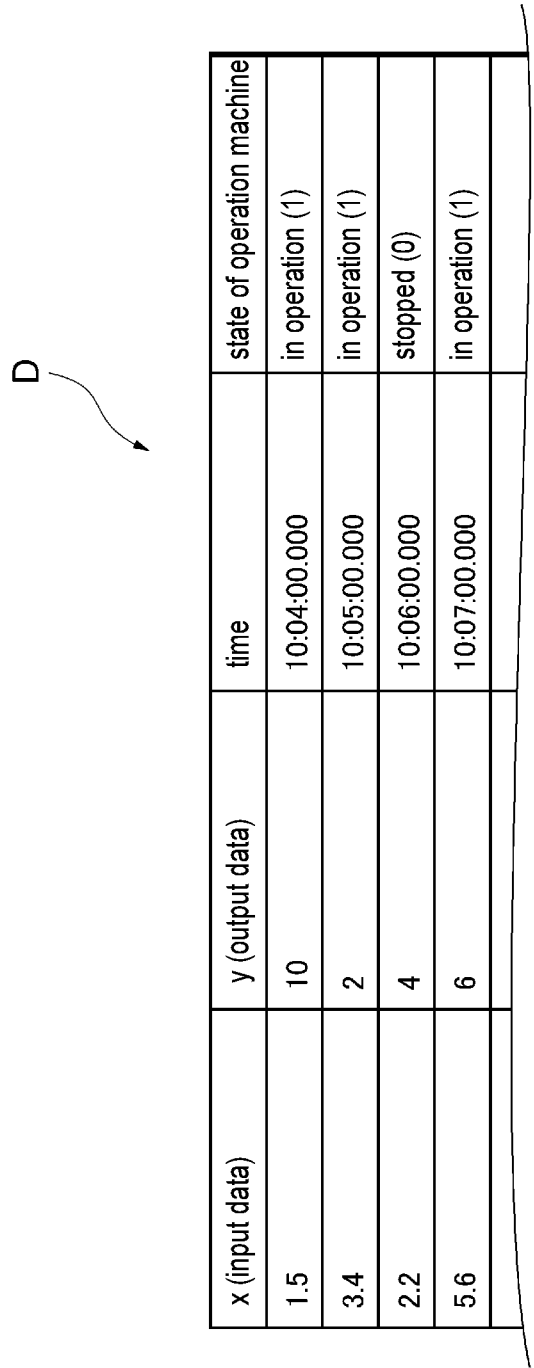
FIG. 3 is a diagram showing data used in the control system according to the embodiment.

FIG. 3 is a diagram showing data D used in the control system 1 according to the embodiment. The data D may be stored in the learning data storage part 21 and includes input data x input to the controller 11a, output data y output from the controller 11a, and information regarding a time at which the input data x and the output data y are obtained and a state of the operation machine 30 when the input data x and the output data y are obtained.

In the data D of the example, the input data x input to the controller 11a is "1.5" for a time "10:04:00.000", "3.4" for a time "10:05:00.000", "2.2" for a time "10:06:00.000", and "5.6" for a time "10:07:00.000". Besides, these numerical values are merely illustrative, and the input data may be a vector value or an image. For example, the time may be an absolute time shown in the example, or a count value from the reference time such as an internal clock value of the CPU 10a or the like of the control device 10. However, when the count value from the reference time is stored, the time may be read as an absolute time when referring to the time in the control system 1. In addition, in the example, the time is shown in the format of hour, minute, second, and millisecond for simplification, but the time may be stored in seconds or microseconds.

In the data D of the example, the output data y output from the controller 11a is "10" for the time "10:04:00.000", "2" for the time "10:05:00.000", "4" for the time "10:06:00.000", and "6" for the time "10:07:00.000". Besides, these numerical values represent the control amount of the operation machine 30 in a simplified manner and are merely illustrative, and the output data may be a vector value or a truth value. Besides, even when the input data x is an image, the output data y may be a numerical value representing the control amount of the operation machine 30. When the input data x is an image, the image may be input to the controller 11a after being subjected to preprocessing such as cutting out a specific region of the image, performing smoothing by convolution calculation between the image and a Gaussian kernel, emphasizing an edge by convolution calculation between the image and a Sobel filter, or binarizing a color image.

In addition, in the data D of the example, the information regarding the state of the operation machine 30 when the input data x and the output data y are obtained is "in operation (1)" for the time "10:04:00.000", "in operation (1)" for the time "10:05:00.000", "stopped (0)" for the time "10:06:00.000", and "in operation (1)" for the time "10:07:00.000". Here, "1" and "0" in parentheses are binary values representing the operating state or the stopped state. Besides, when three or more types of states of the operation machine 30 are recorded, an arbitrary numerical value may be associated with each state. In addition, these are merely illustrative, and the information regarding the state may be a vector value, a character, or a truth value.

Figure 4:
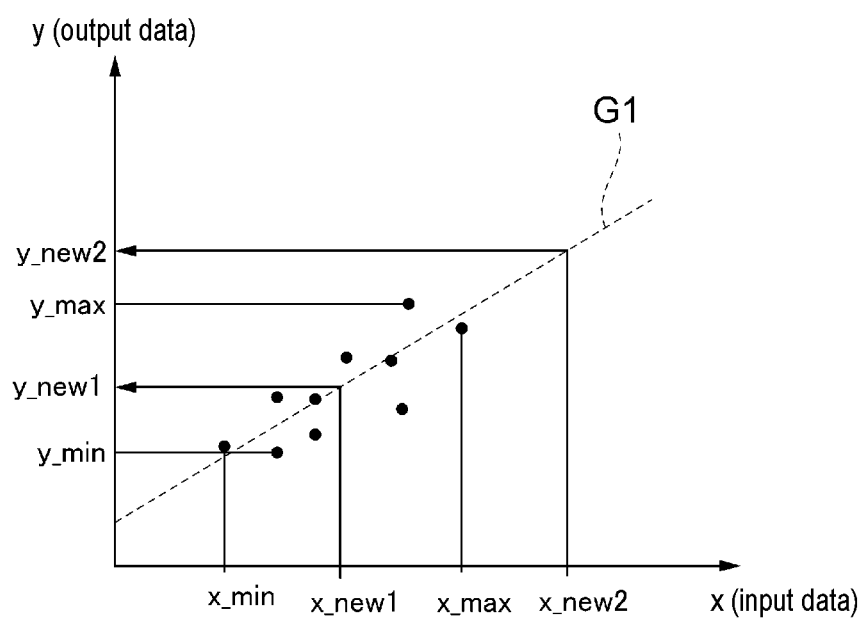
FIG. 4 is a diagram showing statistics of input data and output data of a controller according to the embodiment in a simplified manner.

FIG. 4 is a diagram showing the statistics of the input data and the output data of the controller 11a according to the embodiment in a simplified manner. In this diagram, the input data and the output data are respectively simplified as one-dimensional data, the horizontal axis indicates "x (input data)", and the vertical axis indicates "y (output data)". The plurality of plot points indicates values of the previously obtained input data and output data.

In the graph shown in FIG. 4, the minimum value "x_min" and the maximum value "x_max" of the previously obtained input data and the minimum value "y_min" and the maximum value "y_max" of the previously obtained output data are shown. In addition, in the diagram, a first graph G1 indicating what kind of output data is output when new input data is input to the controller 11a is shown by a broken line. Here, the controller 11a is trained so as to reproduce the relationship between the previously obtained input data and output data, and the first graph G1 is illustrated as a linear function for simplicity.

When new input data "x_new1" is input to the controller 11a, the controller 11a outputs new output data "y_new1" according to the learned first graph G1. As shown in FIG. 4, the new input data "x_new1" is larger than the minimum value "x_min" and smaller than the maximum value "x_max" of the previously obtained input data. In addition, the new output data "y_new1" is larger than the minimum value "y_min" and smaller than the maximum value "y_max" of the previously obtained output data. Accordingly, the evaluation part 13 may evaluate that the new input data "x_new1" and the new output data "y_new1" do not deviate from the statistics of the previously obtained input data and output data. In this case, the new output data "y_new1" output from the controller 11a may be used to control the operation machine 30.

On the other hand, when new input data "x_new2" is input to the controller 11a, the controller 11a outputs new output data "y_new2" according to the learned first graph G1. As shown in FIG. 4, the new input data "x_new2" is larger than the minimum value "x_min" and the maximum value "x_max" of the previously obtained input data. In addition, the new output data "y_new2" is larger than the minimum value "y_min" and the maximum value "y_max" of the previously obtained output data. That is, the new input data "x_new2" and the new output data "y_new2" are data larger than the maximum values of the previously obtained input data and output data and having no track record previously used for controlling the operation machine 30. In this case, the evaluation part 13 may evaluate that the new input data "x_new2" and the new output data "y_new2" deviate from the statistics of the previously obtained input data and output data. Specifically, the evaluation part 13 may evaluate the extent of deviation of the input data according to (x_new2−x_max) or may evaluate the extent of deviation of the output data according to (y_new2−y_max). In this case, the auxiliary controller 11b may be used to control the operation machine 30 without using the new output data "y_new2" output from the controller 11a.

Figure 5:
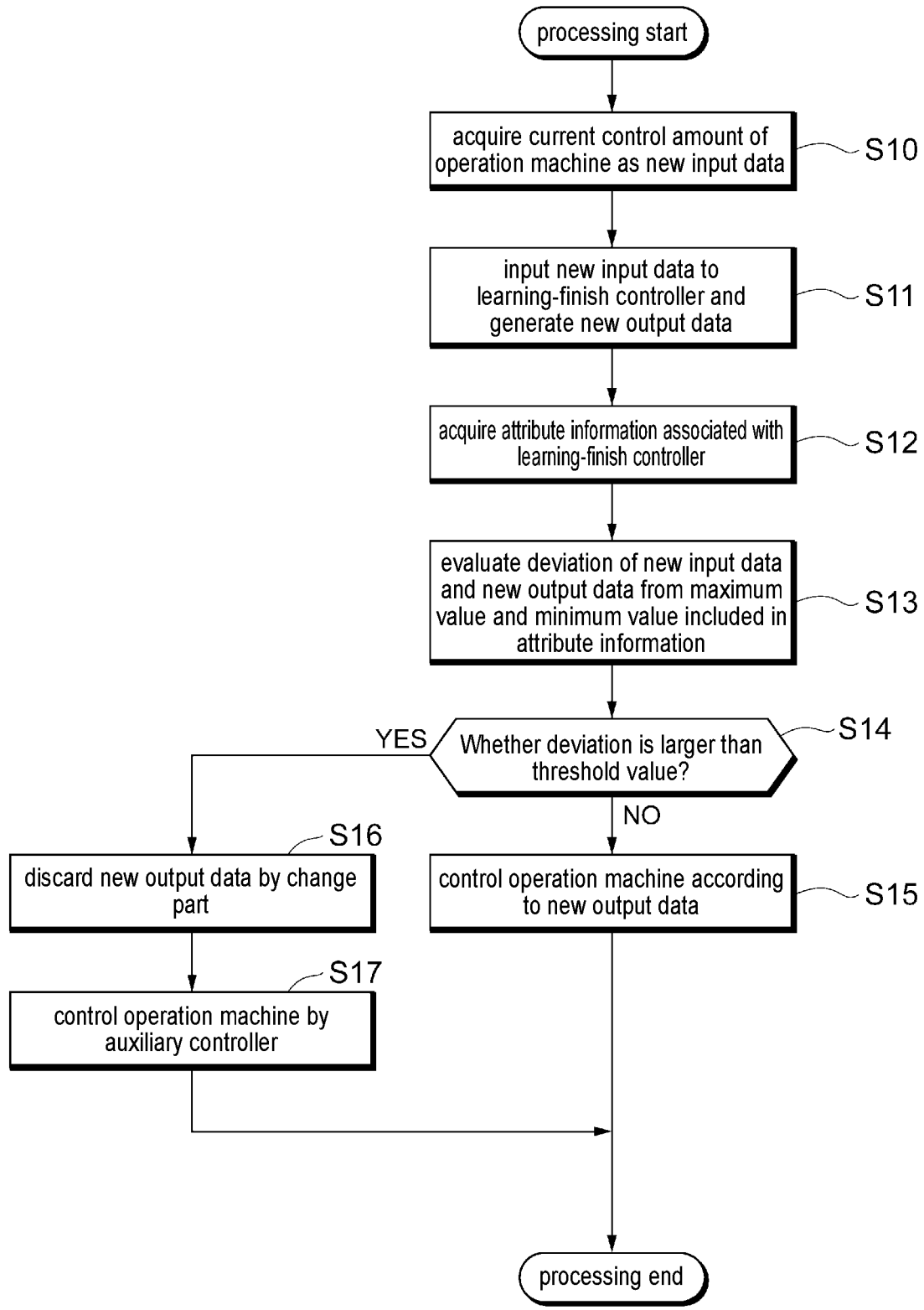
FIG. 5 is a flowchart of first control processing on an operation machine executed by the control system according to the embodiment.

FIG. 5 is a flowchart of first control processing on the operation machine 30 executed by the control system 1 according to the embodiment. The control system 1 first acquires the current control amount of the operation machine 30 as new input data by the control device 10 (S10).

The control device 10 inputs the new input data to the learning-finish controller 11a and generates new output data (S11). Then, the control device 10 acquires attribute information associated with the learning-finish controller 11a (S12). Here, the attribute information associated with the learning-finish controller 11a may be attribute information generated by the generation part 23 from the learning data used in the learning processing of the learning-finish controller 11a.

Thereafter, the control device 10 evaluates the deviation of the new input data and the new output data from the maximum value and the minimum value included in the attribute information (S13). Besides, the target to be compared with the new input data and the new output data may be the statistics included in the attribute information, and may be the average value, median value, quartile, variance and the like of the previously obtained input data and output data or a combination thereof.

When the deviation evaluated by the control device 10 is not larger than the threshold value (S14: NO), the control device 10 controls the operation machine 30 according to the new output data output from the controller 11a (S15). On the other hand, when the deviation evaluated by the control device 10 is larger than the threshold value (S14: YES), the control device 10 discards the new output data by the change part 14 (S16) and controls the operation machine 30 by the auxiliary controller 11b (S17). Besides, in the example described above, the deviation between the new input data and new output data and the maximum value and minimum value included in the attribute information is evaluated after the new output data is generated by the controller 11a. However, the attribute information associated with the learning-finish controller 11a may be acquired and the deviation between the new input data and the maximum value and minimum value included in the attribute information may be evaluated before the new output data is generated by the controller 11a. Then, when the evaluated deviation is not larger than the threshold value, the control device 10 may generate new output data by the controller 11a and control the operation machine 30 according to the new output data. On the other hand, when the evaluated deviation is larger than the threshold value, the control device 10 may control the operation machine 30 by the auxiliary controller 11b without inputting new input data to the controller 11a. Thereby, the first control processing ends.

Figure 6:
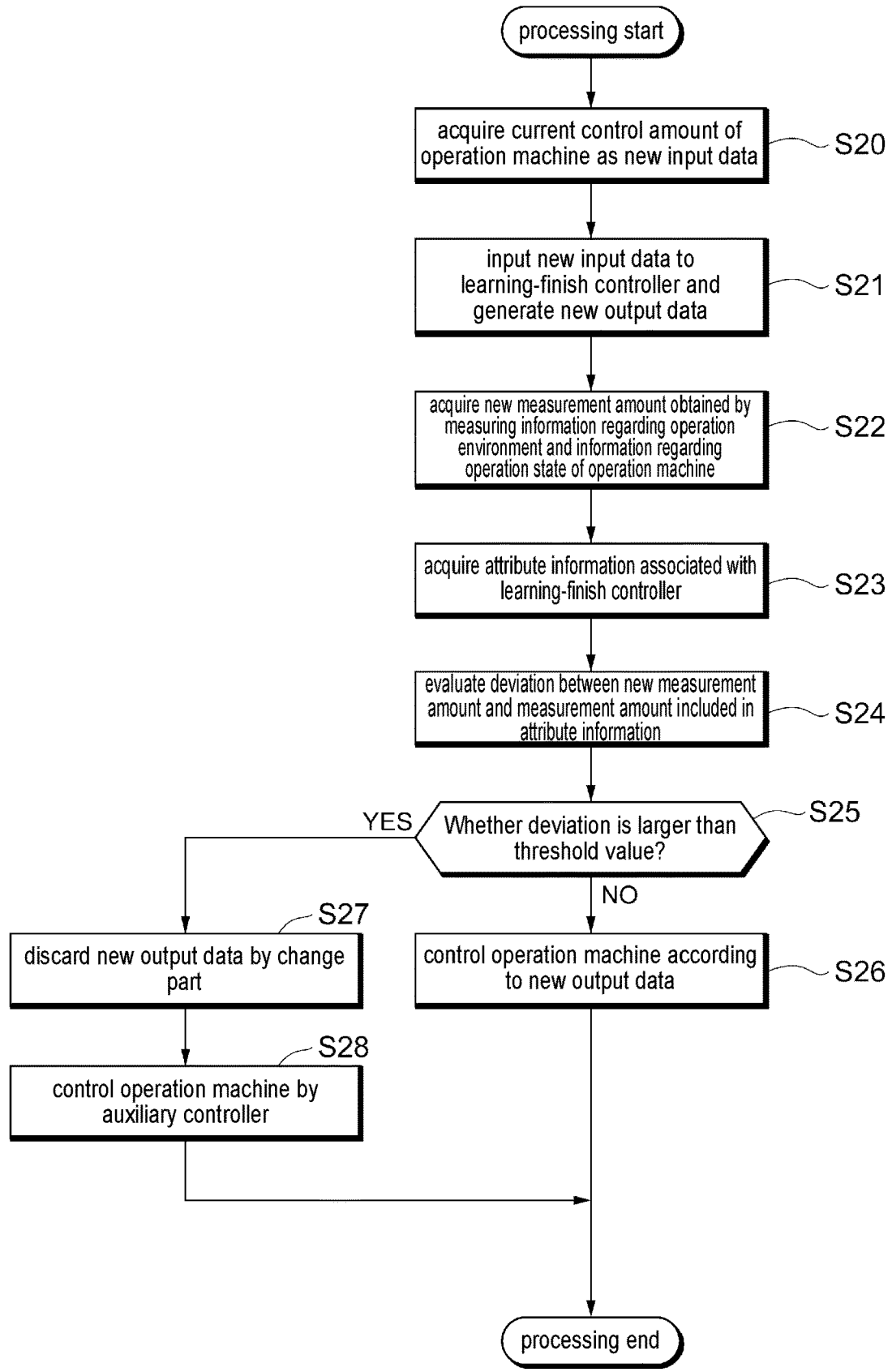
FIG. 6 is a flowchart of second control processing on the operation machine executed by the control system according to the embodiment.

FIG. 6 is a flowchart of second control processing on the operation machine 30 executed by the control system 1 according to the embodiment. The second control processing is processing for evaluating the deviation between the new measurement amount measured by the measurement device 40 and the previously measured measurement amount, and controlling the operation machine 30.

The control system 1 first acquires the current control amount of the operation machine 30 as new input data by the control device 10 (S20). Thereafter, the control device 10 inputs the new input data to the learning-finish controller 11a and generates new output data (S21).

In addition, the control system 1 measures, by the measurement device 40, a new measurement amount including the information regarding the environment in which the operation machine 30 operates and the information regarding the state of the operation machine 30, and acquires the new measurement amount by the control device 10 (S22).

The control device 10 acquires attribute information associated with the learning-finish controller 11a (S23). Here, the attribute information may include the information regarding the environment in which the operation machine 30 operates and the information regarding the state of the operation machine 30 that are measured previously by the measurement device 40.

The control device 10 evaluates the deviation between the new measurement amount and the measurement amount included in the attribute information (S24). Besides, the new measurement amount and the previously measured measurement amount may be compared based on a reference set by the setting part 15.

When the deviation evaluated by the control device 10 is not larger than the threshold value (S25: NO), the control device 10 controls the operation machine 30 according to the new output data output from the controller 11a (S26). On the other hand, when the deviation evaluated by the control device 10 is larger than the threshold value (S25: YES), the control device 10 discards the new output data by the change part 14 (S27) and controls the operation machine 30 by the auxiliary controller 11b (S28). Beside, in the example described above, the deviation between the new measurement amount and the measurement amount included in the attribute information is evaluated after the new output data is generated by the controller 11a. However, the attribute information associated with the learning-finish controller 11a may be acquired and the deviation between the new measurement amount and the measurement amount included in the attribute information may be evaluated before the new output data is generated by the controller 11a. Then, when the evaluated deviation is not larger than the threshold value, the control device 10 may generate new output data by the controller 11a and control the operation machine 30 according to the new output data. On the other hand, when the evaluated deviation is larger than the threshold value, the control device 10 may control the operation machine 30 by the auxiliary controller 11b without inputting new input data to the controller 11a. Thereby, the second control processing ends.

Figure 7:
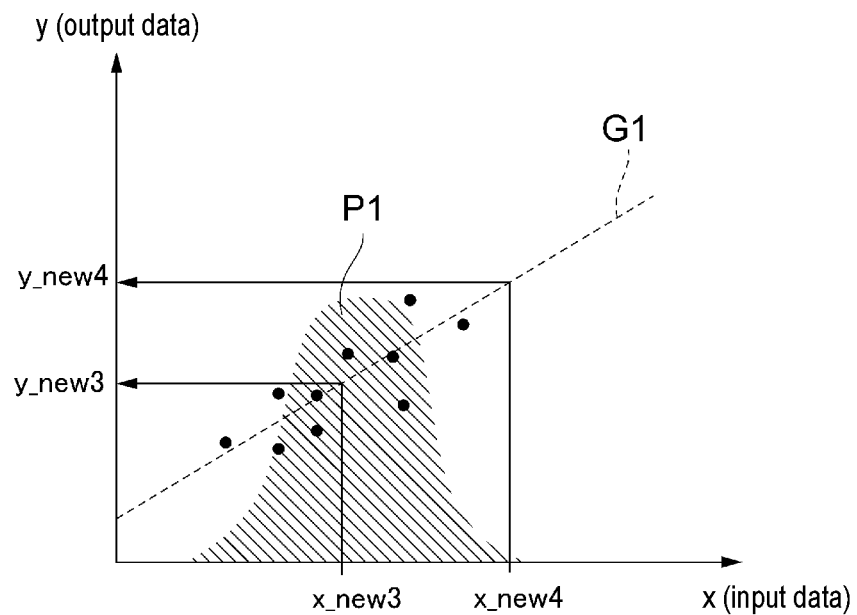
FIG. 7 is a diagram showing probability distributions of the input data and the output data of the controller according to the embodiment in a simplified manner.

FIG. 7 is a diagram showing the probability distributions of the input data and the output data of the controller 11a according to the embodiment in a simplified manner. In this diagram, the input data and the output data are respectively simplified as one-dimensional data, the horizontal axis indicates "x (input data)", and the vertical axis indicates "y (output data)". The plurality of plot points indicates values of the previously obtained input data and output data.

In the graph shown in FIG. 7, a first probability distribution P1 obtained based on the sample average and the sample variance of the previously obtained input data is shown. In addition, in the diagram, the first graph G1 indicating what kind of output data is output when new input data is input to the controller 11a is shown by a broken line. Here, the controller 11a is trained so as to reproduce the relationship between the previously obtained input data and output data, and the first graph G1 is illustrated as a linear function for simplicity.

When new input data "x_new3" is input to the controller 11a, the controller 11a outputs new output data "y_new3" according to the learned first graph G1. As shown in FIG. 7, the new input data "x_new3" is data in which the value of the first probability distribution P1 becomes almost the maximum value. In addition, the new input data "x_new3" is data within the range of $\mu \pm 1\sigma$, wherein $\mu$ represents an average value of the first probability distribution P1 and $\sigma$ represents a standard deviation. Accordingly, the evaluation part 13 may evaluate that the new input data "x_new3" and the new output data "y_new3" do not deviate from the statistics of the previously obtained input data and output data. In this case, the new output data "y_new3" output from the controller 11a may be used to control the operation machine 30.

On the other hand, when new input data "x_new4" is input to the controller 11a, the controller 11a outputs new output data "y_new4" according to the learned first graph G1. Here, the new input data "x_new4" is data in which the value of the first probability distribution P1 becomes almost zero. In addition, the new input data "x_new4 is data that is not within the range of $\mu \pm 1\sigma$ or the range of $\mu \pm 2\sigma$, wherein represents an average value of the first probability distribution P1 and a represents a standard deviation. In this case, the evaluation part 13 may evaluate that the new input data "x_new4" and the new output data "y_new4" deviate from the statistics of the previously obtained input data and output data. Specifically, the evaluation part 13 may evaluate the extent of deviation of the input data according to (x_new4−$\mu$)/$\sigma$. In this case, the auxiliary controller 11b may be used to control the operation machine 30 without using the new output data "y_new4" output from the controller 11a.

Figure 8:
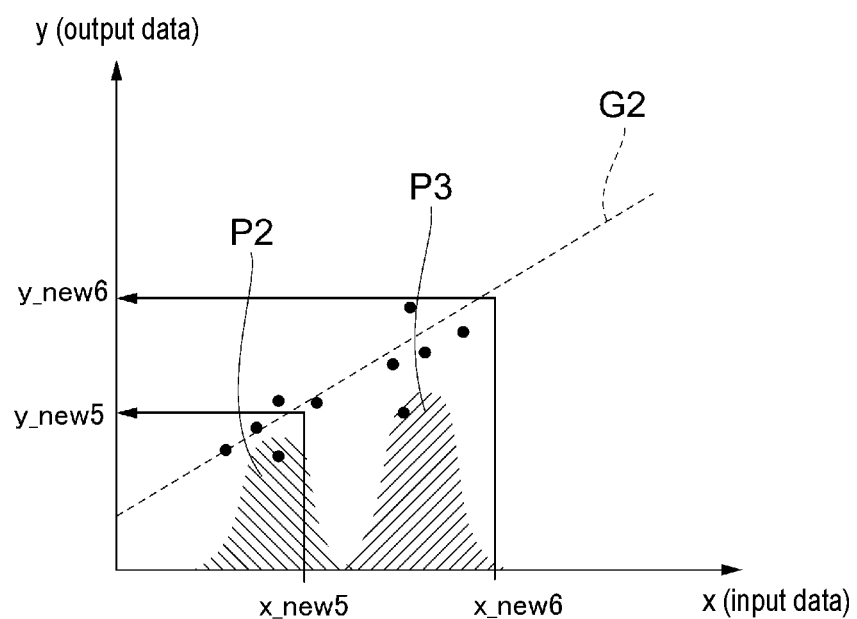
FIG. 8 is a diagram showing another example of the probability distributions of the input data and the output data of the controller according to the embodiment in a simplified manner.

FIG. 8 is a diagram schematically showing another example of the probability distributions of the input data and the output data of the controller 11a according to the embodiment. In this diagram, the input data and the output data are respectively simplified as one-dimensional data, the horizontal axis indicates "x (input data)", and the vertical axis indicates "y (output data)". The plurality of plot points indicates values of the previously obtained input data and output data.

In the graph shown in FIG. 8, a mixture normal distribution including a second probability distribution P2 and a third probability distribution P3 is shown as the probability distribution of the previously obtained input data. The second probability distribution P2 is obtained based on the sample average and the sample variance of a first cluster of the previously obtained input data, and the third probability distribution P3 is obtained based on the sample average and the sample variance of a second cluster of the previously obtained input data. In addition, in the diagram, a second graph G2 indicating what kind of output data is output when new input data is input to the controller 11a is shown by a broken line. Here, the controller 11a is trained so as to reproduce the relationship between the previously obtained input data and output data, and the second graph G2 is exemplified as a linear function for simplicity.

When new input data "x_new5" is input to the controller 11a, the controller 11a outputs new output data "y_new5" according to the learned second graph G2. As shown in FIG. 8, the new input data "x_new5" is data in which the value of the second probability distribution P2 becomes almost the maximum value. In addition, the new input data "x_new5" is data within the range of $\mu+1\sigma$, wherein $\mu$ represents an average value of the second probability distribution P2 and $\sigma$ represents a standard deviation. Accordingly, the evaluation part 13 may evaluate that the new input data "x_new5" and the new output data "y_new5" do not deviate from the statistics of the previously obtained input data and output data. In this case, the new output data "y_new5" output from the controller 11a may be used to control the operation machine 30.

On the other hand, when new input data "x_new6" is input to the controller 11a, the controller 11a outputs new output data "y_new6" according to the learned second graph G2. Here, the new input data "x_new6" is data in which the values of the second probability distribution P2 and the third probability distribution P3 become almost zero. In addition, the new input data "x_new6" is data that is not within the range of $\mu\pm1\sigma$ and the range of $\mu\pm2\sigma$, wherein $\mu$ represents an average value of the third probability distribution P3 and $\sigma$ represents a standard deviation. In this case, the evaluation part 13 may evaluate that the new input data "x_new6" and the new output data "y_new6" deviate from the statistics of the previously obtained input data and output data. Specifically, the evaluation part 13 may evaluate the extent of deviation of the input data according to $(x\_new6-\mu)/\sigma$ for example. In this case, the auxiliary controller 11b may be used to control the operation machine 30 without using the new output data "y_new6" output from the controller 11a.

Figure 9:
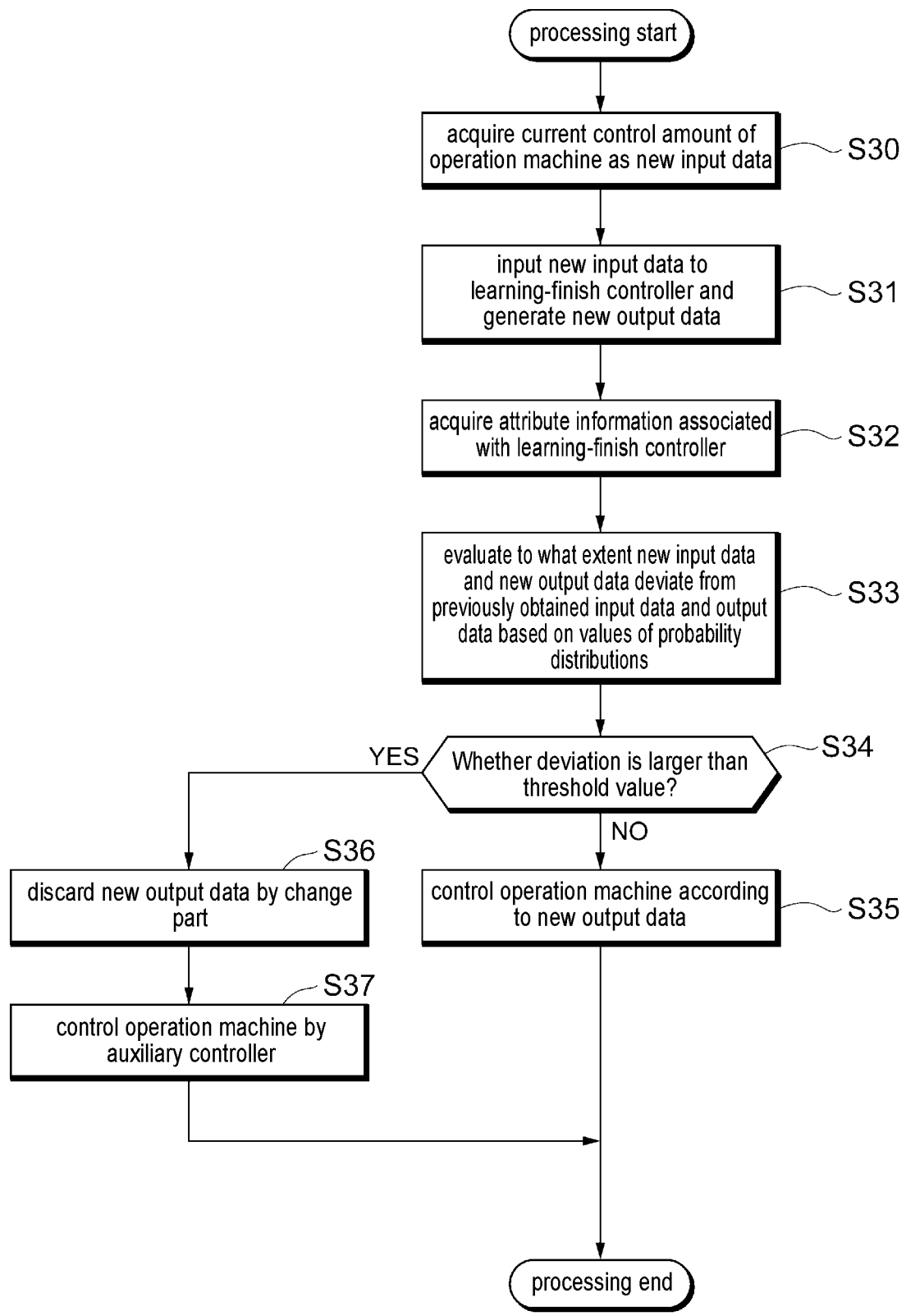
FIG. 9 is a flowchart of third control processing of the operation machine executed by the control system according to the embodiment.

FIG. 9 is a flowchart of third control processing of the operation machine 30 executed by the control system 1 according to the embodiment. The third control processing is processing for evaluating the deviation of the new input data and the new output data from the previously obtained input data and output data based on the values of the probability distributions of the previously obtained input data and output data, and controlling the operation machine 30.

The control system 1 first acquires the current control amount of the operation machine 30 as new input data by the control device 10 (S30). Then, the control device 10 inputs the new input data to the learning-finish controller 11a and generates new output data (S31). The control device 10 acquires attribute information associated with the learning-finish controller 11a (S32). Here, the attribute information associated with the learning-finish controller 11a may be attribute information generated by the generation part 23 from the learning data used in the learning processing of the learning-finish controller 11a.

Thereafter, the control device 10 evaluates, based on the values of the probability distributions of the previously obtained input data and output data, to what extent the new input data and the new output data deviate from the previously obtained input data and output data (S33).

When the deviation evaluated by the control device 10 is not larger than the threshold value (S34: NO), the control device 10 controls the operation machine 30 according to the new output data output from the controller 11a (S35). On the other hand, when the deviation evaluated by the control device 10 is larger than the threshold value (S34: YES), the control device 10 discards the new output data by the change part 14 (S36) and controls the operation machine 30 by the auxiliary controller 11b (S37). Besides, in the example described above, the extent to which the new input data and the new output data deviate from the previously obtained input data and output data is evaluated based on the values of the probability distributions of the previously obtained input data and output data after the new output data is generated by the controller 11a. However, the attribute information associated with the learning-finish controller 11a may be acquired and the extent to which the new input data and the new output data deviate from the previously obtained input data and output data may be evaluated based on the values of the probability distributions of the previously obtained input data and output data before the new output data is generated by the controller 11a. Then, when the evaluated deviation is not larger than the threshold value, the control device 10 may generate new output data by the controller 11a and control the operation machine 30 according to the new output data. On the other hand, when the evaluated deviation is larger than the threshold value, the control device 10 may control the operation machine 30 by the auxiliary controller 11b without inputting new input data to the controller 11a. Thereby, the third control processing ends.

The embodiment described above is intended to facilitate the understanding of the disclosure and not to limit the interpretation of the disclosure. Each element included in the embodiment and the arrangement, material, condition, shape, size and the like thereof are not limited to the illustrated ones and can be appropriately changed. In addition, the configurations shown in different embodiments can be partially replaced or combined.

APPENDIX 1

A control device, including:
a control part (11) that includes a controller (11a) for outputting output data with respect to input data and uses the controller (11a) to control an operation machine (30);
an acquisition part (12) that acquires attribute information including statistics of the previously obtained input data and output data; and
an evaluation part (13) that evaluates, based on comparison of the attribute information with at least one of new input data newly input to the controller (11a) and new output data output from the controller (11a) with respect to the new input data, to what extent at least one of the new input data and the new output data deviates from the statistics.

APPENDIX 2

The control device according to appendix 1, further including:
a change part (14) that changes at least one of the new input data and the new output data based on the extent of deviation evaluated by the evaluation part (13).

APPENDIX 3

The control device according to appendix 2,
wherein the change part (14) does not use at least one of the new input data and the new output data based on the extent of deviation evaluated by the evaluation part (13), and
the control part (11) uses another controller (11b) different from the controller (11a) to control the operation machine (30).

APPENDIX 4

The control device according to any one of appendixes 1 to 3,
wherein the attribute information further includes a measurement amount including at least one of information regarding an environment in which the operation machine (30) operates and information regarding a state of the operation machine (30) that are measured previously by a measurement device, and
the evaluation part (13) evaluates, based on comparison of the attribute information with a new measurement amount measured by the measurement device when at least one of the new input data and the new output data is generated, to what extent the new measurement amount deviates from the measurement amount.

APPENDIX 5

The control device according to appendix 4,
wherein the information regarding the environment includes information regarding a time at which the operation machine (30) is controlled by the control part (11), and
the information regarding the state includes information for distinguishing whether the operation machine (30) is in operation or stopped.

APPENDIX 6

The control device according to appendix 4 or 5, further including:
a setting part (15) that sets a reference for performing comparison between the new measurement amount and the measurement amount by the evaluation part (13).

APPENDIX 7

The control device according to any one of appendixes 1 to 6,
wherein the input data and the output data include numerical data, the attribute information includes the maximum value and the minimum value of the input data and the output data, and
the evaluation part (13) evaluates to what extent at least one of the new input data and the new output data deviates from the maximum value and the minimum value.

APPENDIX 8

The control device according to any one of appendixes 1 to 7,
wherein the input data and the output data include numerical data, the attribute information includes probability distributions of the input data and the output data, and
the evaluation part (13) evaluates, based on values of the probability distributions, to what extent at least one of the new input data and the new output data deviates from the input data and the output data.

APPENDIX 9

The control device according to any one of appendixes 1 to 8,
wherein the controller (11a) includes a learning-finish model generated by machine learning in which learning data defining a relationship between the input data and the output data is used.

APPENDIX 10

A control system, including a learning device that executes learning processing of a controller (11a) by machine learning in which learning data defining a relationship between input data and output data is used, and a control device having a control part (11) that uses the controller (11a) to control an operation machine (30),
wherein the learning device further includes
a generation part (23) that generates attribute information including statistics of the previously obtained input data and output data; and
the control device further includes:
an acquisition part (12) that acquires the attribute information, and
an evaluation part (13) that evaluates, based on comparison of the attribute information with at least one of new input data newly input to the controller (11a) and new output data output from the controller (11a) with respect to the new input data, to what extent at least one of the new input data and the new output data deviates from the statistics.

APPENDIX 11

The control system according to appendix 10, further including
a measurement device that measures information regarding an environment in which the operation machine (30) operates,
wherein the generation part (23) generates the attribute information based on the information regarding the environment.

APPENDIX 12

The control system according to appendix 10 or 11, further including
a measurement device that measures information regarding a state of the operation machine (30),
wherein the generation part (23) generates the attribute information based on the information regarding the state.

APPENDIX 13

A control method, including:
using a controller (11a) for outputting output data with respect to input data to control an operation machine (30);
acquiring attribute information including statistics of the input data and the output data; and
evaluating, based on comparison of the attribute information with at least one of new input data newly input to the controller (11a) and new output data output from the controller (11a) with respect to the new input data, to what extent at least one of the new input data and the new output data deviates from the statistics.

APPENDIX 14

A non-transitory computer-readable storage medium, which stores a control program,
causing a calculation part equipped in a control device to operate as:
a control part (11) that includes a controller (11a) for outputting output data with respect to input data and uses the controller (11a) to control an operation machine (30);
an acquisition part (12) that acquires attribute information including statistics of the input data and the output data; and an evaluation part (13) that evaluates, based on comparison of the attribute information with at least one of new input data newly input to the controller (11a) and new output data output from the controller (11a) with respect to the new input data, to what extent at least one of the new input data and the new output data deviates from the statistics.

What is claimed is:

1. A control device, comprising:
a control part that comprises a controller for acquiring a current control amount of an operation machine as new input data and outputting new output data with respect to the new input data and is configured to use the controller to control the operation machine;
an acquisition part that is configured to acquire attribute information comprising statistics of previously obtained input data and output data; and
an evaluation part that is configured to:
compare the new input data with the statistic of the previously obtained input data to obtain a first comparison result and compare the new output data with the statistic of the previously obtained output data to obtain a second comparison result; and
evaluate, based on at least one of the first comparison result and the second comparison result, to what extent at least one of the new input data and the new output data deviates from the statistics,
wherein the control part uses the new output data output from the controller to control the operation machine in response to the evaluation part evaluating that the new input data and the new output data do not deviate from the statistics,
the control part uses an auxiliary controller different from the controller without using the new output data to control the operation machine in response to the evaluation part evaluating that the new input data and the new output data deviate from the statistics.

2. The control device according to claim 1, further comprising:
a change part that is configured to change at least one of the new input data and the new output data based on the extent of deviation evaluated by the evaluation part.

3. The control device according to claim 2,
wherein the change part is configured to do not use at least one of the new input data and the new output data based on the extent of deviation evaluated by the evaluation part, and
the control part is configured to use another controller different from the controller to control the operation machine.

4. The device according to claim 1,
wherein the attribute information further comprises a measurement amount comprising at least one of information regarding an environment in which the operation machine operates and information regarding a state of the operation machine that are measured previously by a measurement device, and
the evaluation part is configured to evaluate, based on comparison of the attribute information with a new measurement amount measured by the measurement device when at least one of the new input data and the new output data is generated, to what extent the new measurement amount deviates from the measurement amount.

5. The control device according to claim 4,
wherein the information regarding the environment comprises information regarding a time at which the operation machine is controlled by the control part, and the information regarding the state comprises information for distinguishing whether the operation machine is in operation or stopped.

6. The control device according to claim 4, further comprising:
a setting part that is configured to set a reference for performing comparison between the new measurement amount and the measurement amount by the evaluation part.

7. The control device according to claim 1,
wherein the input data and the output data comprise numerical data,
the attribute information comprises maximum value and minimum value of the input data and the output data, and
the evaluation part is configured to evaluate to what extent at least one of the new input data and the new output data deviates from the maximum value and the minimum value.

8. The control device according to claim 1,
wherein the input data and the output data comprise numerical data,
the attribute information comprises probability distributions of the input data and the output data, and
the evaluation part is configured to evaluate, based on values of the probability distributions, to what extent at least one of the new input data and the new output data deviates from the input data and the output data.

9. The control device according to claim 1,
wherein the controller comprises a learning-finish model generated by machine learning in which learning data defining a relationship between the input data and the output data is used.

10. A control system, comprising a learning device that is configured to execute learning processing of a controller by machine learning in which learning data defining a relationship between input data and output data is used, and a control device having a control part that comprises the controller for acquiring a current control amount of an operation machine as new input data and outputting new output data with respect to the new input data and is configured to use the controller to control the operation machine,
wherein the learning device further comprises
a generation part that is configured to generate attribute information comprising statistics of previously obtained input data and output data; and
the control device further comprises:
an acquisition part that is configured to acquire the attribute information, and
an evaluation part that is configured to:
compare the new input data with the statistic of the previously obtained input data to obtain a first comparison result and compare the new output data with the statistic of the previously obtained output data to obtain a second comparison result; and
evaluate, based on at least one of the first comparison result and the second comparison result, to what extent at least one of the new input data and the new output data deviates from the statistics,
wherein the control part uses the new output data output from the controller to control the operation machine in response to the evaluation part evaluating that the new input data and the new output data do not deviate from the statistics,
the control part uses an auxiliary controller different from the controller without using the new output data to control the operation machine in response to the evaluation part evaluating that the new input data and the new output data deviate from the statistics.

11. The control system according to claim 10, further comprising
a measurement device that is configured to measure information regarding an environment in which the operation machine operates,
wherein the generation part is configured to generate the attribute information based on the information regarding the environment.

12. The control system according to claim 10, further comprising
a measurement device that is configured to measure information regarding a state of the operation machine,
wherein the generation part is configured to generate the attribute information based on the information regarding the state.

13. A control method, comprising:
using a controller for acquiring a current control amount of an operation machine as new input data and outputting new output data with respect to the new input data to control the operation machine;
acquiring attribute information comprising statistics of previously obtained input data and the output data;
comparing the new input data with the statistic of the previously obtained input data to obtain a first comparison result and comparing the new output data with the statistic of the previously obtained output data to obtain a second comparison result;
evaluating, based on at least one of the first comparison result and the second comparison result, to what extent at least one of the new input data and the new output data deviates from the statistics;
using the new output data output from the controller to control the operation machine in response to evaluating that the new input data and the new output data do not deviate from the statistics; and
using an auxiliary controller different from the controller without using the new output data to control the operation machine in response to evaluating that the new input data and the new output data deviate from the statistics.

14. A non-transitory computer-readable storage medium, which stores a control program,
causing a calculation part equipped in a control device to operate as:
a control part that comprises a controller for acquiring a current control amount of an operation machine as new input data and outputting new output data with respect to the new input data and uses the controller to control an operation machine;
an acquisition part that acquires attribute information comprising statistics of previously obtained input data and the output data; and
an evaluation part that: compares the new input data with the statistic of the previously obtained input data to obtain a first comparison result and compares the new output data with the statistic of the previously obtained output data to obtain a second comparison result; and evaluates, based on at least one of the first comparison result and the second comparison result, to what extent at least one of the new input data and the new output data deviates from the statistics,
wherein the control part uses the new output data output from the controller to control the operation machine in response to the evaluation part evaluating that the new input data and the new output data do not deviate from the statistics,
the control part uses an auxiliary controller different from the controller without using the new output data to control the operation machine in response to the evaluation part evaluating that the new input data and the new output data deviate from the statistics.

* * * * *